(12) United States Patent
Batliner et al.

(10) Patent No.: US 6,283,232 B1
(45) Date of Patent: Sep. 4, 2001

(54) ROCK DRILL

(75) Inventors: Rainer Batliner, Schaanwald (LT);
Steven Moseley, Feldkirch-Tisis (AT);
Edwin Schweizer, Balzers (LT); Udo Hauptmann, Landsberg/Lech (DE)

(73) Assignee: Hilti Aktiengesellschaft, Schaan (LT)

( * ) Notice: Subject to any disclaimer, the term of this patent is extended or adjusted under 35 U.S.C. 154(b) by 0 days.

(21) Appl. No.: 09/528,598

(22) Filed: Mar. 20, 2000

(30) Foreign Application Priority Data

Apr. 15, 1999 (DE) .............................................. 199 16 975

(51) Int. Cl.⁷ ...................................................... E21B 10/40
(52) U.S. Cl. ............................................. 175/415; 175/420
(58) Field of Search ..................................... 174/296, 417, 174/415, 420, 428, 430, 431, 414; 299/39.1, 55

(56) References Cited

U.S. PATENT DOCUMENTS 5,836,410   11/1998   Kleine .

FOREIGN PATENT DOCUMENTS 4306981   9/1994  (DE) .
0607958   7/1994  (EP) .
0657617   6/1995  (EP) .

OTHER PUBLICATIONS

Search Report.

*Primary Examiner*—Frank S. Tsay
(74) *Attorney, Agent, or Firm*—Sidley Austin Brown & Wood, LLP

(57) ABSTRACT

A rock drill including a drill stem (2), major cutting edges (5, 6) extending substantially over a diameter of the drill stem (2) and projecting beyond the end face (3) of the drill stem, and at least one minor cutting edge (9, 10) extending substantially in a radial direction and provided on at least one elongate cutting body (7, 8) which projects beyond the end face (3), with the minor cutting edge (9, 10) being located, at a contemplated rotational direction (R) of the drill (1) about the drill axis (A), in front of a corresponding major cutting edge (5, 6) adjacent to a main discharge groove (13) for drilling dust, and with the elongate cutting body (7, 8) having a cutting surface (11) tapering from the minor cutting edge (9) toward the end face (3) of the drill stem (2) and having at least one inclination surface (12) adjacent to the circumference of the drill stem (2) and inclined toward the circumference of the drill stem and with respect to a radial extension of the minor cutting edge (9), in a direction opposite the drill rotational direction (R).

7 Claims, 1 Drawing Sheet

ROCK DRILL

BACKGROUND OF THE INVENTION

1. Field of the Invention

The present invention relates to a rock drill including a drill stem having an end face, major cutting edges extending substantially over a diameter of the drill stem and projecting beyond the end face, and at least one minor cutting edge extending substantially in a radial direction and provided on at least one elongate cutting body which projects beyond the end face of the drill stem, with the minor cutting edge being located, at a contemplated rotational direction of the drill about its axis, in front of a corresponding major cutting edge adjacent to a main discharge groove for drilling dust.

2. Description of the Prior Cut

In order to improve the cutting characteristics and the cutting capability, the rock drills are provided with major cutting edges, which usually extend over the diameter of a drill stem, and one or more minor cutting edges. The major and minor cutting edges are provided on cutting bodies which project beyond the end face of the drill stem and which are formed of a metal-cutting material, e.g., hard metal. The minor cutting edges are provided, e.g., on pin-shaped cutting bodies which are inserted, in addition to a major cutting edge-carrying cutting plate, in the end face of the drill stem or in the circumferential surface of the drill stem. In an alternative embodiment of a rock drill, the minor cutting edge or edges is/are provided on an elongate, plate-shaped, cutting body that projects from the end face of the drill stem and projects beyond the drill stem circumference. The elongate, plate-shaped, cutting body has a shape of an approximately ridge prism. In conventional rock drills, the arrangement of the minor cutting edges is so selected that they are located, at a contemplated rotational direction of a drill about its rotational axis, in front of an associated major cutting edge. As a result, the discharge of a drilling dust, which occurs during drilling, precedes respective minor cutting edges.

During drilling of bores in a reinforced concrete with such drills, it can occur that the drill, upon contacting the reinforcing iron, would be deflected, which can result in a bore shape that would deviate from a predetermined geometry of the bore. Further, the drill deflection can result in an unexpected passing of the torque peaks onto the user, and this causes, as a rule, interruption of the drilling process.

Accordingly, an object of the present invention, is to eliminate the drawbacks of the conventional rock drills by providing a rock drill capable of retaining its position during a sidewise encounter with a reinforcing iron.

SUMMARY OF THE INVENTION

This and other objects of the present invention, which would become apparent hereinafter, are achieved by providing a rock drill that includes a drill stem having an end face, major cutting edges extending substantially over a diameter of the drill stem and projecting beyond the end face, and at least one minor cutting edge. The minor cutting edge extends substantially in a radial direction and is provided on at least one elongate cutting body which projects beyond the end face of the drill stem. The minor cutting edge is located, at a contemplated rotational direction of the drill about its axis, in front of a corresponding major cutting edge adjacent to a main discharge groove for drilling dust. The elongate cutting body has a cutting surface tapering from the minor cutting edge toward the end face of the drill stem and has at least one inclination surface in its section adjacent to the circumference of the drill stem. The inclination surface is inclined toward the circumference of the drill stem and is inclined, with respect to a radial extension of the minor cutting edge in a direction opposite the drill rotational direction. The inclination surface prevents, during a rotary-percussion drilling of bores in a reinforced concrete, the deflection of the drill upon a sidewise or tangential encounter of the drill with a reinforcing iron. The inclination surface causes, upon an encounter with the reinforcing iron, a short-time lift of the drill and its displacement past the reinforcing iron. As a result, the rotation of the drill is not interrupted even upon an encounter with the reinforcing iron. Also, the provision of the inclination surface prevents a contact of the hard edges and corners of the cutting body with the reinforcing iron which, in a most unfavorable case, can result in breaking of the cutting body.

The functioning of a rock drill is advantageously improved when the inclination surface is inclined, in a direction of the circumference of the drill stem toward the drill rotational axis at an angle amounting from about 100° to about 150°. A particularly good functioning is achieved when the inclination surface is inclined with respect to the radial extent of the minor cutting edge at an angle from about 5° to about 80°.

The cutting surface of the minor cutting edge can be formed of two portions, with the portion located adjacent to the drill stem circumference forming the inclination surface. In order to dissipate or carry away to a most possible extent the forces generated upon an encounter of the drill with the reinforcing iron, advantageously, the inclination surface is formed so that it extends, starting from the circumference of the drill stem over from about 20% to about 100% of the radial extent of the elongate cutting body.

A further improvement in functioning of the drill upon encounter with a reinforcing iron is achieved when the end face of the drill stem has a shape of a substantially conical surface which has an inclination smaller than or equal to the inclination of the inclination surface of the minor cutting edge-carrying cutting body. In this way, upon encounter with the reinforcing iron, the end face slides therealong and passes, without any hindrance, into the inclination surface of the minor cutting edge-carrying cutting body.

For a symmetrical loading of the drill and for further improvement of the drilling capability of the drill, it is advantageous when there are provided two plate-shaped cutting bodies carrying two minor cutting edges, respectively. In this case the cutting bodies are arranged on opposite sides of major cutting edges-carrying major cutting tip. Preferably, the cutting bodies are arranged diametrically opposite each other.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
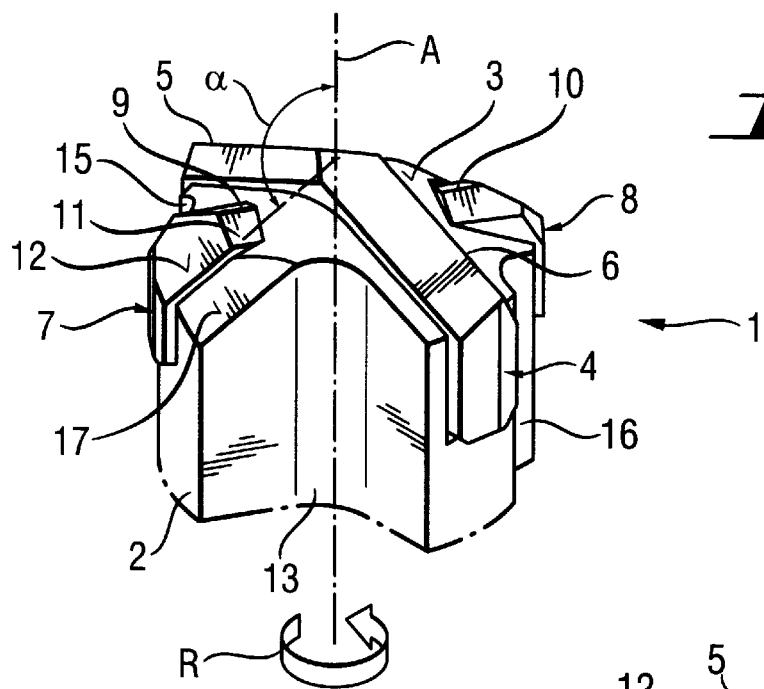
FIG. 1 a perspective view of a front section of a rock drill according to the present invention provided with major and minor bits.
Figure 2:
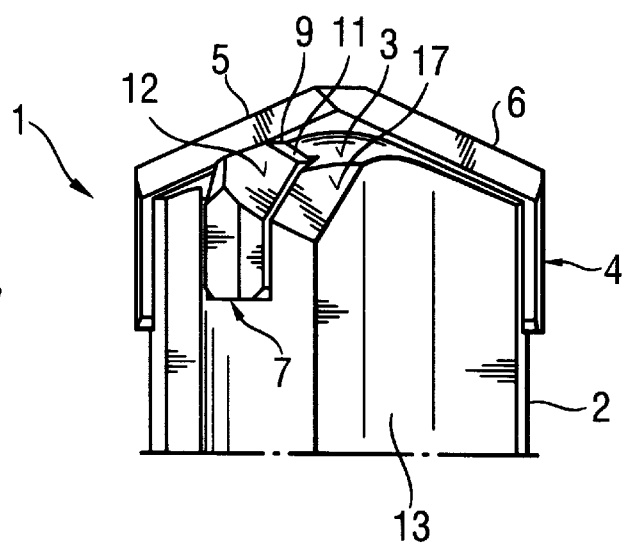
FIG. 2 a side view of the section of the rock drill shown in FIG. 1.

A rock drill according to the present invention, a front section of which is shown in FIGS. 1–2, is generally designated with a reference numeral 1. The rock drill 1 has a stem 2 with an end face 3. Major cutting edges 5, 6 and minor cutting edges 9, 10 project beyond the end face 3. The major cutting edges 5 and 6 are arranged on a major tip 4 which extends over the diameter of the drill stem 2. The minor cutting edges 9, 10 extend substantially radially and are provided on elongate plate-shaped cutting bodies 7 and 8. The major tip 4 and the plate-shaped cutting bodies 7 and 8 are inserted into axially extending slots, which are formed in the drill stem 2, and are secured there soldering. The axial slots open at the end face 3 of the drill stem 2 and at is circumference. The major tip 4 and the cutting bodies 7 and 8 project beyond the drill stem in both an axial direction and a radial direction. The axis of the drill stem 2 is designated with a reference character "A".

With reference to a contemplated direction of rotation R of the drill 1, the minor cutting edges 9, 10 on the cutting bodies 7, 8 precede the respective major cutting edges 5 and 6. However, the minor cutting edges 9, 10, with reference to the rotational direction R of the drill 1, trail discharge grooves 15, 16 for discharging the drill dust, which is formed during drilling. The discharge grooves can be provided between the plate-shaped cutting bodies 7, 8 and the major tip 4, as shown in FIGS. 1–2.

The plate-shaped cutting bodies 7, 8 have cutting surfaces 11 which extend from respective minor cutting edges 9, 10 toward the end face 3. The trailing, in the rotational direction R, surfaces, which extend from the respective minor cutting edges 9, 10 to the end face 3 of the drill stem 2, form free surfaces of the cutting bodies 7, 8. The cutting surface 1 1, in the embodiment shown in the drawing, has two portions and has an inclination surface 12 located adjacent to the circumference of the drill stem 2. The inclination surface 12 is inclined toward the circumference of drill stem 2. The inclination angle α toward the drill stem axis A amounts, preferably, from 100° to 150°. Simultaneously, the inclination surface 12 is also inclined toward the radial extension of the minor bit 9 in a direction opposite the rotational direction R of the drill 1 at an angle β amounting from about 5° to about 80°. The end face 3 of the drill stem 2 is not plane. Rather, it has a substantially conical shape.

Figure 3:
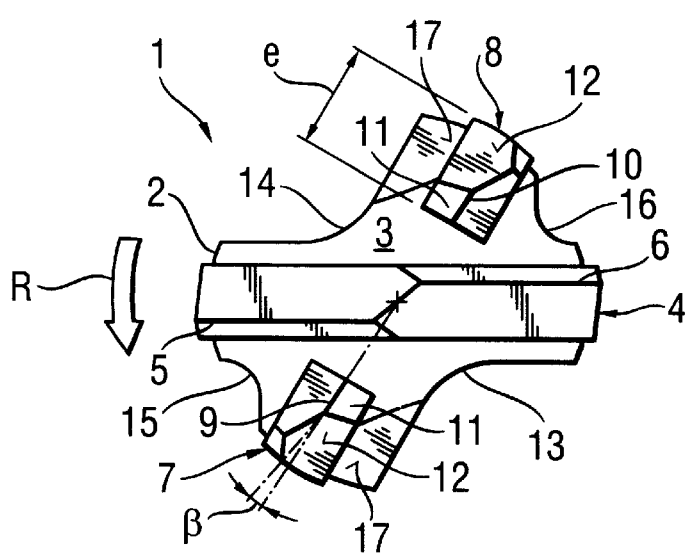
FIG. 3 a top view of the section of the rock drill shown in FIG. 1.

The region of the conical end face 3, which is located in front of the inclination surfaces 12, can, as shown in FIGS. 1–3, be provided with a flattening 17. The inclination angle of the flattenings 17 is, preferably, equal or smaller than the inclination of the inclination surface 12.

The present invention was described with reference to an embodiment of a drill the major and minor cutting edges of which are formed on plate-shaped cutting elements made of a cutting material, preferably, hard material and secured in the end face of the bore stem. It should be understood that the arrangement of the inclination surface according to the present invention in the region of the minor cutting edge can be effected also in a drill which formed entirely of a hard material. Further, the present invention is not limited to a rock drill with two, diametrically opposite minor cutting edges.

Accordingly, although the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A rock drill, comprising a drill stem (2) having an end face (3); major cutting edges (5, 6) extending substantially over a diameter of the drill stem (2) and projecting beyond the end face (3); and at least one minor cutting edge (9, 10) extending substantially in a radial direction and provided on at least one elongate cutting body (7, 8) which projects beyond the end face (3) of the drill stem (2), the minor cutting edge (9, 10) being located, at a contemplated rotational direction (R) of the drill (1) about an axis (A) thereof, in front of a corresponding major cutting edge (5, 6) adjacent to a main discharge groove (13) for drilling dust, and the elongate cutting body (7, 8) having a cutting surface (11) tapering from the minor cutting edge (9) toward the end face (3) of the drill stem (2) and having at least one inclination surface (12) in a section thereof located adjacent to a circumference of the drill stem (2), the inclination surface (12) being inclined toward the circumference of the drill stem and inclined, with respect to a radial extension of the minor cutting edge (9) in a direction opposite the drill rotational direction (R).

2. A rock drill according to claim 1, wherein the inclination surface (12) is inclined, in a direction of the circumference of the drill stem (2) toward the rotational axis (A) at an angle (α) amounting from about 100° to about 150°.

3. A rock drill according to claim 2, wherein the inclination surface (12) is inclined with respect to the radial extent of the minor cutting edge (9) at angle (β) from about 5° to about 80°.

4. A rock drill according to claim 1, wherein the inclination surface (12), starting from the circumference of the drill stem (2), extends over from about 20% to about 100% of the radial extent of the elongate cutting body (7).

5. A rock drill according to claim 1, wherein the end face (3) of the drill stem (2) has a substantially conical shape and has a flattening (17) inclined at an angle one of smaller and equal one of the inclination angle (α) of the inclination surface (12) toward the rotational axis (A) and the inclination angle (β) of the inclination surface (12) with respect to the radial extent of the minor cutting edge (9).

6. A rock drill according to claim 1, comprising two plate-shaped cutting bodies (7, 8) carrying, respectively, two minor cutting edges (9, 10) located on opposite sides of a major tip (4) carrying the major cutting edges (5, 6) and located opposite each other.

7. A rock drill according to claim 6, wherein the two minor cutting edges are located diametrically opposite each other.

* * * * *